Figure 1:
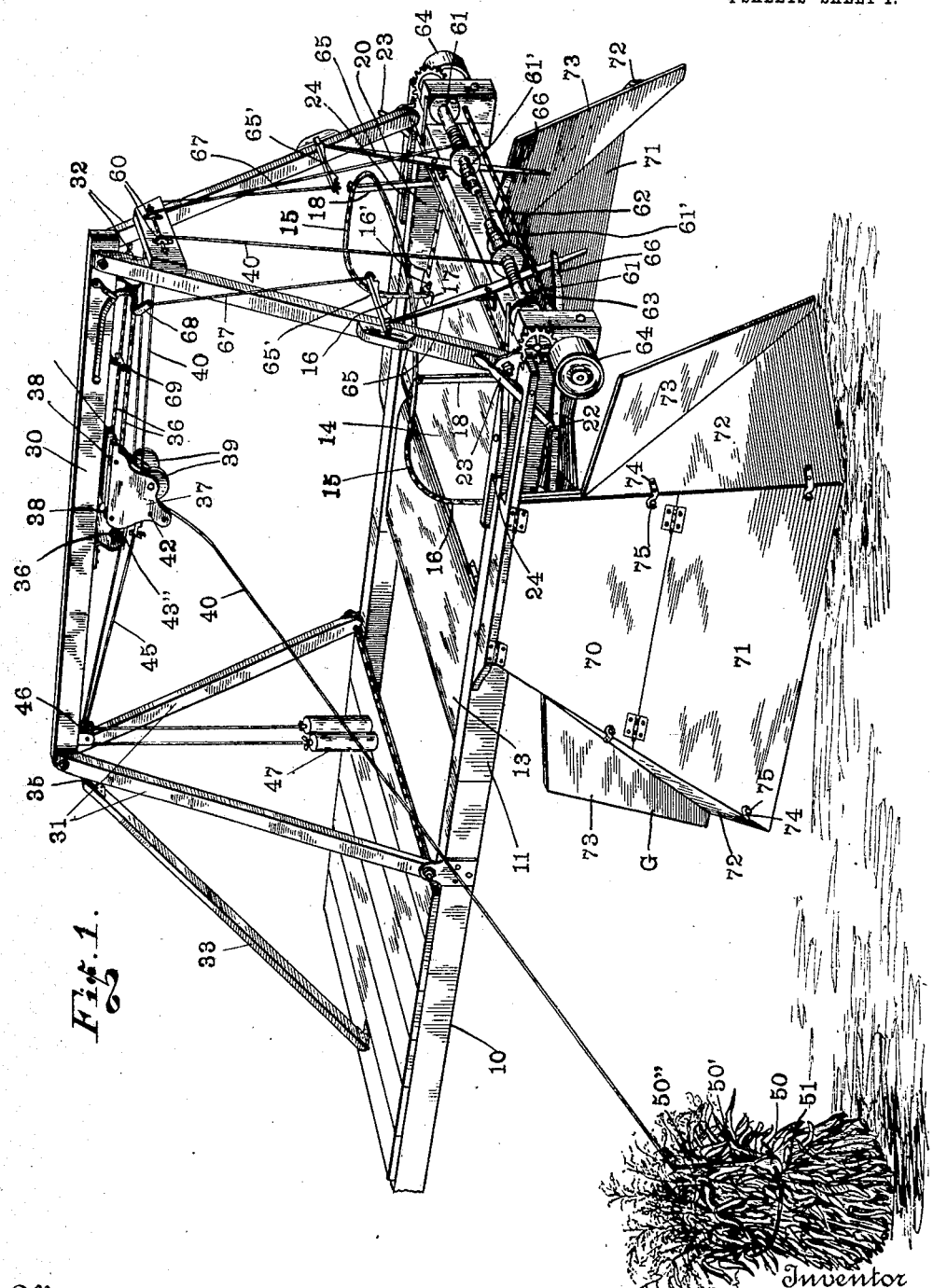

J. B. SCHUMAN.
SHOCK HANDLING ATTACHMENT FOR CROP TREATING MACHINES.
APPLICATION FILED APR. 20, 1905.

916,204.

Patented Mar. 23, 1909.
4 SHEETS—SHEET 1.

Witnesses
Adelaide Kearns
J. A. Walsh

Inventor
James B. Schuman
By
Bradford & Hood
Attorneys

THE NORRIS PETERS CO., WASHINGTON, D. C.

J. B. SCHUMAN.
SHOCK HANDLING ATTACHMENT FOR CROP TREATING MACHINES.
APPLICATION FILED APR. 20, 1905.
916,204.
Patented Mar. 23, 1909.
4 SHEETS—SHEET 2.
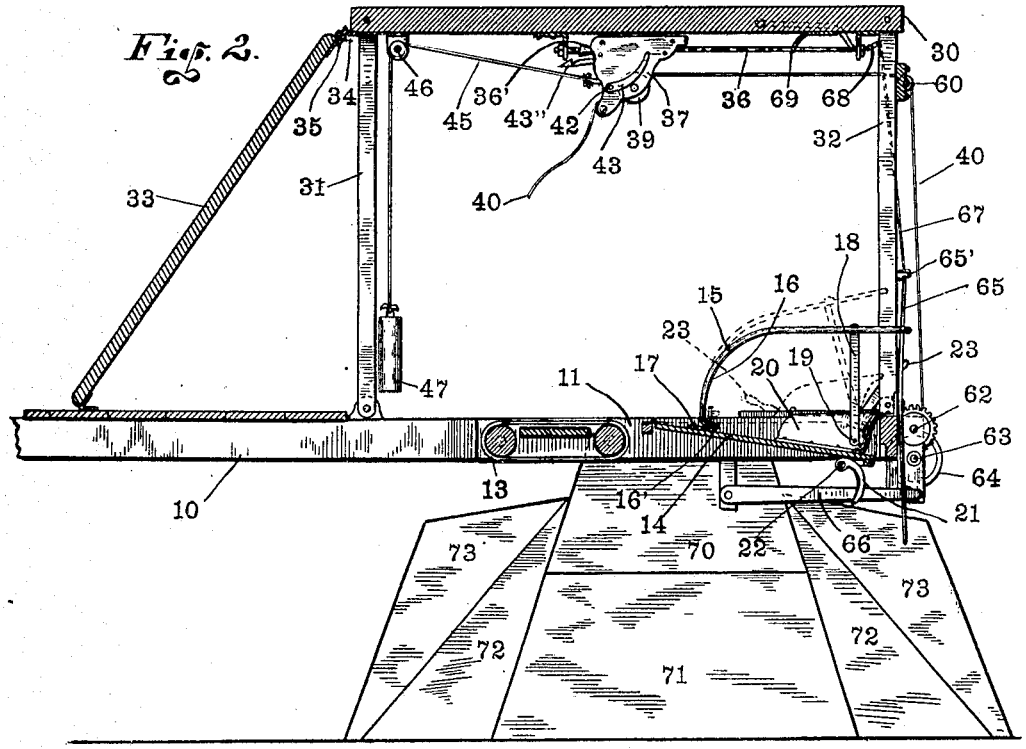
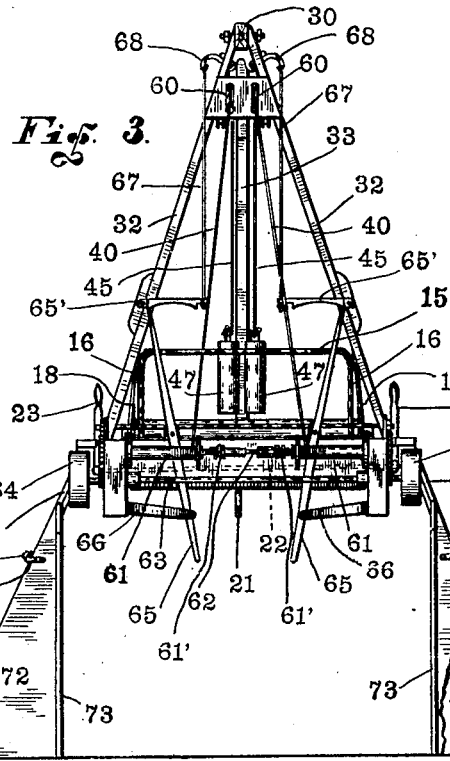
Witnesses
Adelaide Kearns
J. A. Walsh
Inventor
James B. Schuman
By
Bradford & Hood
Attorneys

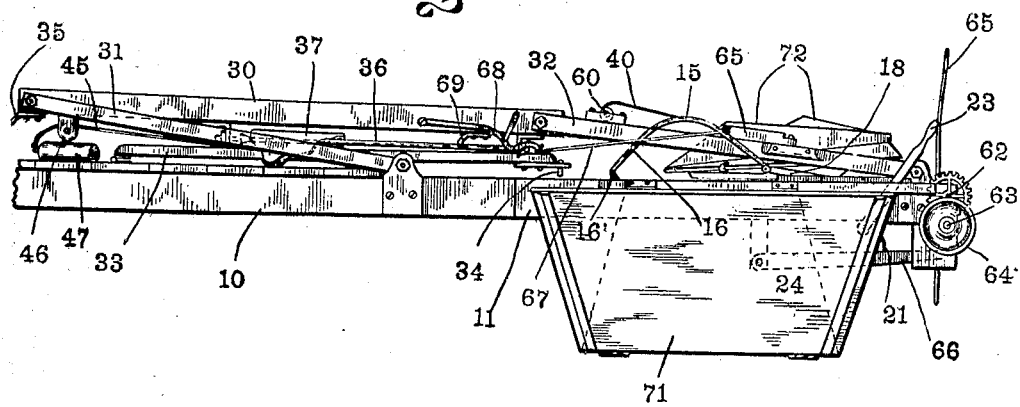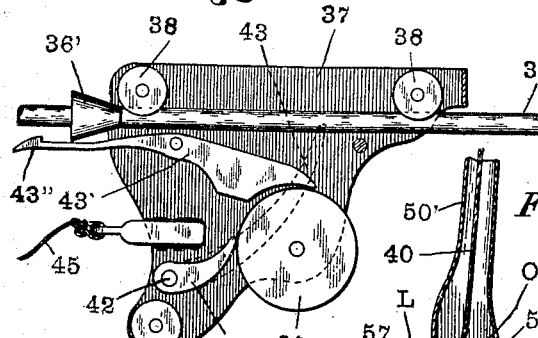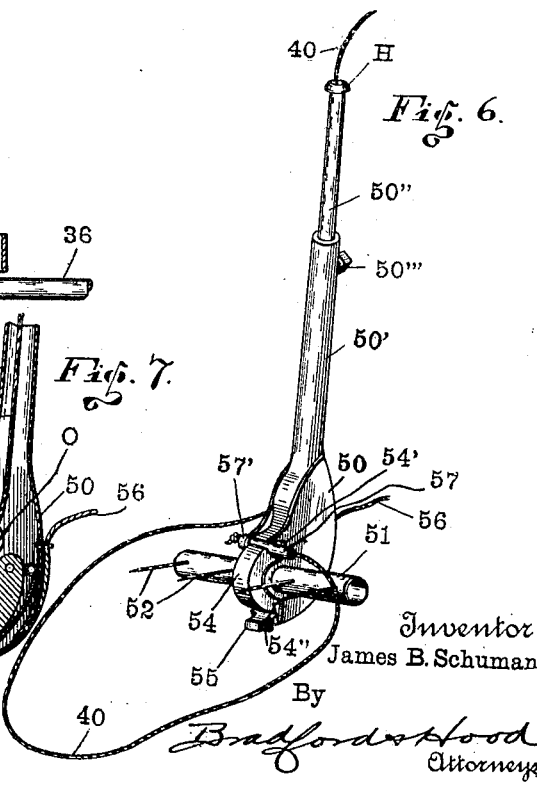

J. B. SCHUMAN.
SHOCK HANDLING ATTACHMENT FOR CROP TREATING MACHINES.
APPLICATION FILED APR. 20, 1905.
916,204.
Patented Mar. 23, 1909.
4 SHEETS—SHEET 4.
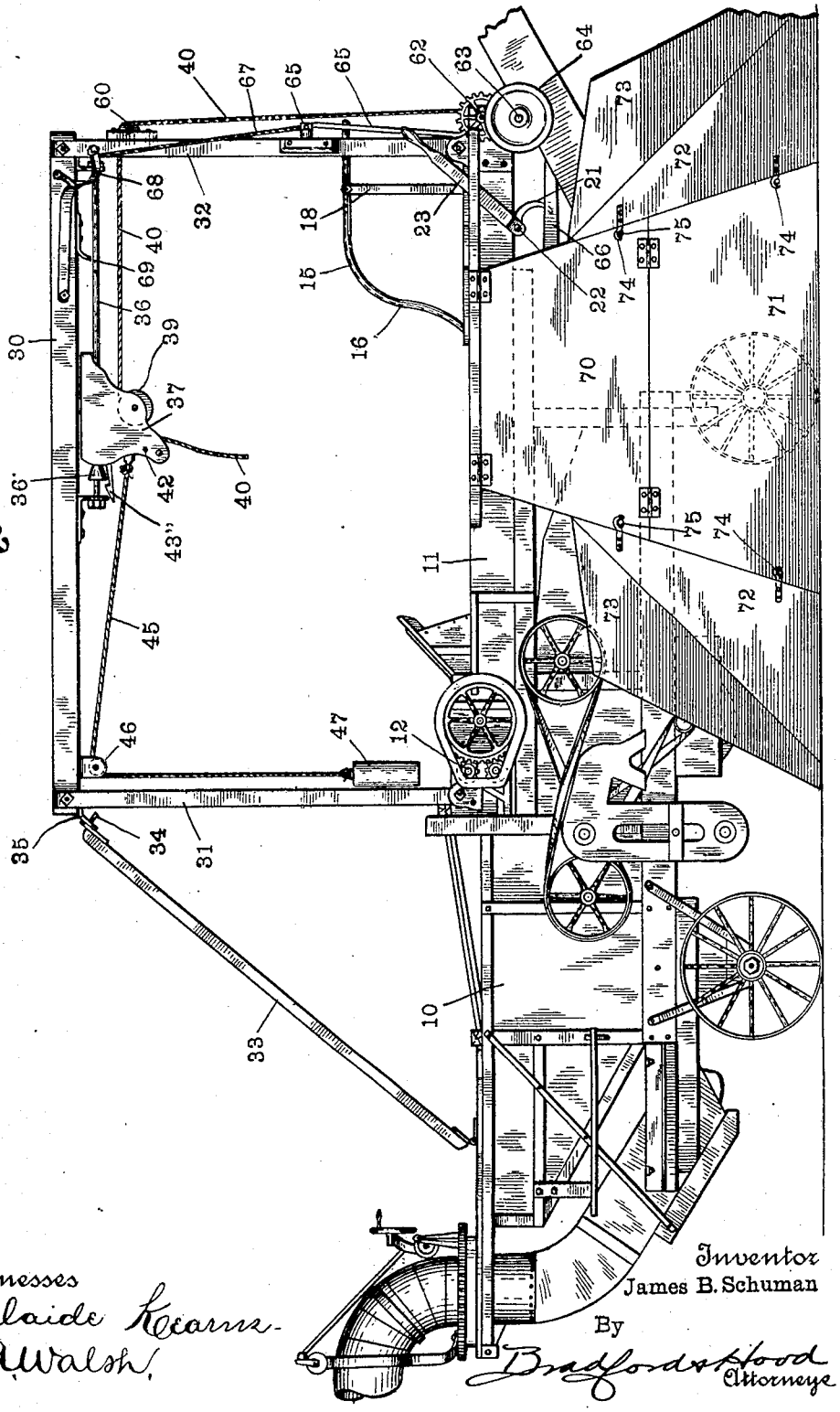
Witnesses
Adelaide Kearns
J. A. Walsh
Inventor
James B. Schuman
By
Bradford & Hood
Attorneys

UNITED STATES PATENT OFFICE.

JAMES B. SCHUMAN, OF INDIANAPOLIS, INDIANA, ASSIGNOR TO A COPARTNERSHIP COMPOSED OF JAMES B. SCHUMAN AND JOSEPH K. SHARPE, JR., OF INDIANAPOLIS, INDIANA, AND THEOPHILUS KING, OF QUINCY, MASSACHUSETTS.

SHOCK-HANDLING ATTACHMENT FOR CROP-TREATING MACHINES.

No. 916,204.      Specification of Letters Patent.      Patented March 23, 1909.

Application filed April 20, 1905. Serial No. 256,642.

*To all whom it may concern:*

Be it known that I, JAMES B. SCHUMAN, a citizen of the United States, residing at Indianapolis, in the county of Marion and State of Indiana, have invented certain new and useful Improvements in Shock-Handling Attachments for Crop-Treating Machines, of which the following is a specification.

In the handling of a corn crop with a shredder considerable difficulty is experienced in getting the stalks to the operators who feed the machine.

The object of my present invention is to provide a structure which may be readily attached to or built upon a shredder by means of which entire shocks may be lifted bodily to the feeding platform and stood upright thereon, the lifting being preferably performed by mechanism driven from the power shaft of the shredder.

A complete shock is smaller at its top and when the band is cut the stalks tend to drop in many directions.

A further object of my invention is, therefore, to provide an adjustable shock-receiving platform, the vertical angle of which may be adjusted to suit conditions and prevent forward tipping of the loosened stalks.

A further object of my invention is to provide such other improvements in construction as shall be hereinafter pointed out.

The accompanying drawings illustrate my invention as applied to a shredder.

Figure 1 is a perspective view; Fig. 2 is a vertical section of the parts shown in Fig. 1; Fig. 3 an end elevation thereof; Fig. 4 a side elevation showing the parts folded and packed for transportation; Fig. 5 a sectional detail of one of the automatic lifting carriages; Fig. 6 a perspective of an improved form of shock grapple; Fig. 7 a transverse section thereon, and Fig. 8 a side elevation of my apparatus associated with a standard shredder.

In the drawings, 10 indicates the frame of the shredder provided with rearwardly extended sills or beams 11 11; 12 indicates any desirable form of snapping rollers, and 13 an endless feeder belt arranged immediately in front of the snapping rollers. Arranged at the rear of the adjacent portions of the sides of platform 14 is a shock embracing fence or guard rail 15, this fence forming what might be termed a crotch into which the shocks may be set and thus held upright. In order that the structure may be readily folded for transportation, I provide the rail 15 at its forward ends with downwardly projecting legs 16 having ends 16' adapted to enter brackets 17 but detachable therefrom, and the main portion of the guard rail is supported by a pair of pivoted links 18 which are pivotally connected at 19 to the platform 14, said platform being provided at its rear with an upturned guard 20 which prevents the butts of the stalks from slipping from the rear of the platform. The platform 14 is supported at its rear end upon one or more cams 21 carried by a shaft 22 which at each end is provided with a hand lever 23 which projects up alongside the adjacent beam 11. Each lever 23 may be engaged by a catch 24, the end of which is projected forward where it may be readily operated by the foot so as to release or hold the corresponding lever 23.

Arranged above the platform 14 and longitudinal of the structure is a beam 30 which is supported at its forward end by legs 31 and at its rear end by legs 32. Both sets of legs are pivoted to the beam 30 and to the beams 11 so that the structure may be folded down to the position shown in Fig. 4, and in order to brace the structure in operation I provide a strut 33 which is hinged to the platform 10 at its lower end, and may be separably connected to the beam 30 by means of the pin 34 adapted to enter a perforated bracket 35 carried by the beam 30. Suspended beneath the beam 30 by brackets are two rods 36 upon each of which is mounted a carriage 37, said carriage being provided with suitable rollers 38 which rest and roll upon the rod. Carriage 37 carries an idler 39 over which a lifting cable 40 passes. Arranged adjacent the idler 39 is a catch 41 which is carried by a shaft 42 pivoted in the carriage, and provided at its inner end with a release lever 43 (see dotted lines in Fig. 5). The free end of catch 41 is adapted to lie immediately adjacent the periphery of the idler 39 for a purpose which will appear. Pivoted in carriage 37 is a latch 43', one end of which lies immediately above the free end of the catch 41 and the outer end of which is provided with a latch head 43" adapted to engage a head 36' carried at the rear end of each rod 36. Attached to the rear side of each carriage 37 is one end of a cord 45 which is passed over an idler 46 and provided with a weight 47 which normally operates to bring its carriage 36 to its rear position with latch 43' behind the head 36'.

The lifting cable 40 may be provided with any suitable shock grapple, as for instance that shown in Figs. 6 and 7. In this construction, I provide a hollow head 50 in which is journaled a transverse rock shaft 51 provided with a plurality of projecting pins 52 adapted to enter a shock transversely. Shaft 51 is provided at its middle with a collar 54 having formed therein at its upper side a transverse notch 54' and at its lower side a transverse shoulder 54'', said shoulder being adapted to be engaged by a spring catch 55. If desired, catch 55 may have attached to its free end a cord 56 by means of which it may be withdrawn from shoulder 54''. The collar 54 is arranged between the sides of the hollow head 50 and is adapted to receive a pin 57 secured to the end of the lifting cable 40, said pin 57 preferably being provided at its outer end with an enlarged portion on head 57'. The head 50 is provided with an upwardly extending shank 50' within which is telescoped a hollow stem 50'' which may be held in any desired position of adjustment, so as to thus vary the effective length of the shank of the head 50, by any suitable means such for instance as a set screw 50'''. The lifting cable 40 passes down through the shank 50''—50' and emerges from the side of the head 50 through an opening O, as shown in Fig. 7.

Each lifting cable 40 is passed to the rear from the idler 39 over which it is carried and from thence downwardly over an idler 60 to one of the winding drums 61, the two drums being sleeved upon a transverse shaft 62 journaled on the beams 11 and geared to a suitable drive shaft 63 which shaft is provided at each end with a pulley 64 by one or the other of which the machine may be driven from some shaft of the shredder (not shown). Splined upon the shaft 62 adjacent each drum 61 is a clutch 61' adapted to be thrown into or out of engagement with the adjacent drum 61 by means of a lever 65, said lever being acted upon by a spring 66 which normally tends to throw the clutch 61' out of engagement with the drum.

Pivoted to each of the legs 32 adjacent the upper end of each lever 65 is a latch 65' adapted to hold lever 65 in either one of its positions. The free end of latch 65' is connected by a cord 67 with an arm 68 arranged in the path of movement of one of the carriages 37, for a purpose which will appear. The finger 69 is suspended from beam 30 in position to engage either one of the release levers 43 when either of the carriages 37 is brought to its rear position.

In order to guide the shock which is being lifted up to the level of the platform, I provide a flaring guard at each side of the machine, and for convenience in transportation I make said guard of several pieces hinged or detachably secured together. In the present drawings, said guard is shown as consisting of a trapezoidal board 70 hinged at its upper edge to one of the beams 11, and having a second trapezoidal board 71 hinged to its lower edge. Detachably secured to each substantially vertical edge of the trapezoid thus formed and extending therefrom at an obtuse angle is a triangular board 72 having at its inner edge a substantially vertical triangular guard 73. The detachable connection is shown in the present case as consisting of hooks 74 attached to the outer edge of the board 72, and adapted to pass behind headed pins 75, one of which projects from each of the boards 70 and 71.

In operation, with the parts erected as shown in Fig. 1, each of the carriages 37 is held at its forward position by its weight 47 and shaft 62 is driven in such a direction as to tend to wind cables 40 on drums 61. Shocks may be lifted simultaneously from both sides of the structure to the platform 14, and the operation for lifting on either side is as follows: An operator on the ground takes the grapple head 50 and sticks the pins 52 into a shock on the side nearest the machine and then passes the free end of rope 40 around the shock, as indicated in Fig. 6, laying pin 57 in notch 54' and swinging head 50 on the shaft 51 until catch 55 engages shoulder 54'' and pin 57 passes beneath a lip L of head 50. The operator on this side of the machine on platform 14 then swings the corresponding lever 65 to bring its clutch member 61' into engagement with the corresponding drum 61, whereupon the drum winds cable 40, the first action being to tighten about the shock and then to drag the shock along the ground from any distance to the guard G up which it is drawn. The upward movement of the shock continues until head H of stem 50'' passes between idler 39 and catch 41. Until this point is reached carriage 37 is held against rearward movement by means of its latch 43', but when the head H passes between idler 39 and catch 41 it comes into contact with latch 43' and withdraws the head 43 thereof from head 36' and thus permits the carriage 37 to move to the rear along its track rod 36, the shock being held suspended by means of the engagement of head H between idler 39 and catch 41. When the carriage reaches the end of its rearward movement it engages the corresponding arm 68 and thus withdraws catch 65' from the corresponding lever 65 whereupon the corresponding spring 66 serves to throw the clutch 61' out of engagement with the drum 61. At the same time the release lever 43 of this carriage is brought into engagement with finger 69 thus withdrawing catch 41 from beneath head H so that head 50 is released from the carriage and the shock is free to drop upon the platform 14 into the crotch formed by the rail 15. The operator then withdraws catch 55 whereupon shaft 51 may be rotated within the head 50 so as to withdraw pin 57 from beneath lip L so that the grapple is thus immediately free from the shock. The platform 14 being slightly inclined downwardly and rearwardly, the stalks, as the shock bands are cut, fall back into the crotch formed by the rail 15 and the operator may readily feed the stalks to the snapping rolls. If at any time the supply of stalks becomes small on the platform 14, either operator may swing the platform 14 upward to the position shown in dotted lines in Fig. 2 so that the remaining stalks may be reached with a little more ease.

When it is desired to transport the machine from one point to another, the lower ends of legs 16 are withdrawn from the brackets 17, and the fence 15 then folded down, as indicated in Fig. 4. Brace 33 is then detached from beam 30 and folded down upon platform 10 whereupon the entire superstructure may be folded down upon the lower pivots of the legs 31, 32, as indicated in Fig. 4. The portions 72—73 of the guards G may then be detached and piled upon platform 14 and the part 71 folded upon part 70, as indicated in Fig. 4.

The shock grapple illustrated herein forms the subject matter of my pending application, Serial Number 256,083.

I claim as my invention:

1. The combination, with a crop treating machine, of a bundle-receiving platform, a track beam arranged above said platform, supporting means for said track beam permitting the same to be lowered to the platform for transportation, a carriage movable along said track beam above the platform, means for normally holding said carriage in one position on the track, shock-lifting mechanism carried by said carriage, means carried by the carriage for engaging and holding suspended said shock-lifting mechanism, means operated by the shock-lifting mechanism for releasing the carriage, and means for releasing the shock-lifting mechanism from the carriage to permit a shock to be deposited upon the platform.

2. The combination, with a crop treating machine, of a bundle-receiving platform, a track beam arranged above said platform, supporting means for said track beam permitting the same to be lowered to the platform for transportation, a carriage movable along said track beam above the platform, means for normally holding said carriage in one position on the track, shock-lifting mechanism carried by said carriage, means carried by the carriage for engaging and holding suspended said shock-lifting mechanism, means operated by the shock-lifting mechanism for releasing the carriage, means for releasing the shock-lifting mechanism from the carriage to permit a shock to be deposited upon the platform, and means for automatically returning the carriage to initial position.

3. The combination, with a crop treating machine, of a vertically-tilting bundle-receiving platform provided at its rear with bundle-supporting means, means for tilting said platform vertically, and lifting mechanism arranged above said platform and adapted to lift bundles to and deposit said bundles upon said platform.

4. The combination, with a crop treating machine, of a vertically-tilting bundle-supporting platform provided at its rear with bundle-supporting means, and means for tilting said platform vertically.

5. The combination, with a crop treating machine, of a vertically-tilting bundle-receiving platform provided at its rear with bundle-supporting means, means for tilting said platform vertically, a track-beam arranged above said platform, a carriage mounted on said track beam, means for normally holding said carriage on the track beam in lifting position, bundle-receiving mechanism carried by said carriage, and means for releasing said carriage holding means.

6. The combination, with a crop treating machine, of a vertically-tilting bundle-receiving platform provided at its rear with bundle-supporting means, means for tilting said platform vertically, a track beam arranged above said platform, a carriage mounted on said track beam, means for normally holding said carriage on the track beam in lifting position, bundle-receiving mechanism carried by said carriage, and means operated by said bundle-lifting mechanism for releasing said carriage-holding means.

7. The combination, with a crop treating machine, of a vertically-tilting bundle-receiving platform provided at its rear with bundle-supporting means, means for tilting said platform vertically, a track-beam arranged above said platform, a carriage mounted on said track-beam, means for normally holding said carriage on the track-beam in lifting position, bundle-receiving mechanism carried by said carriage, means for releasing said carriage holding means, means carried by the carriage for holding the shock-lifting mechanism suspended, and means for automatically releasing said suspending means at a point above the tilting platform.

8. The combination, with a crop treating machine, of a vertically-tilting bundle-receiving platform provided at its rear with bundle-supporting means, means for tilting said platform vertically, a track beam arranged above said platform, a carriage mounted on said track beam, means for normally holding said carriage on the track beam in lifting position, bundle-receiving mechanism carried by said carriage, means operated by said bundle-lifting mechanism for releasing said carriage-holding means, means carried by the carriage for holding the shock-lifting mechanism suspended, and means for automatically releasing said suspending means at a point above the tilting platform.

9. The combination, with a crop treating machine, of a vertically-tilting bundle-receiving platform provided at its rear with bundle-supporting means, means for tilting said platform vertically, a track-beam arranged above said platform, a carriage mounted on said track beam, means for normally holding said carriage on the track beam in lifting position, bundle-receiving mechanism carried by said carriage, means for releasing said carriage-holding means, a winding drum for said lifting mechanism, power-driven driving means for said drum, a separable driving connection between said driving means and drum, means for shifting said separable driving connection, means for holding said shifting means in driving position, and means controlled by the movement of the lifting carriage for automatically separating said driving means.

10. The combination, with a crop treating machine, of a vertically-tilting bundle-receiving platform provided at its rear with bundle-supporting means, means for tilting said platform vertically, a track beam arranged above said platform, a carriage mounted on said track beam, means for normally holding said carriage on the track beam in lifting position, bundle-receiving mechanism carried by said carriage, means operated by said bundle-lifting mechanism for releasing said carriage-holding means, a winding drum for said lifting-mechanism, power-driven driving means for said drum, a separable driving-connection between said driving means and drum, means for shifting said separable driving connection, means for holding said shifting means in driving position, and means controlled by the movement of the lifting carriage for automatically separating said driving means.

11. The combination, with a crop treating machine, of a vertically-tilting bundle-receiving platform provided at its rear with bundle-supporting means, means for tilting said platform vertically, a track-beam arranged above said platform, a carriage mounted on said track beam, means for normally holding said carriage on the track beam in lifting position, bundle-receiving mechanism carried by said carriage, means for releasing said carriage holding means, means carried by the carriage for holding the shock-lifting mechanism suspended, means for automatically releasing said suspending means at a point above the tilting platform, a winding drum for said lifting mechanism, power-driven driving means for said drum, a separable driving-connection between said driving means and drum, means for shifting said separable driving connection, means for holding said shifting means in driving position, and means controlled by the movement of the lifting carriage for automatically separating said driving means.

12. The combination, with a crop treating machine, of a vertically-tilting bundle-receiving platform provided at its rear with bundle-supporting means, means for tilting said platform vertically, a track beam arranged above said platform, a carriage mounted on said track beam, means for normally holding said carriage on the track beam in lifting position, bundle-receiving mechanism carried by said carriage, means operated by said bundle-lifting mechanism for releasing said carriage-holding means, means carried by the carriage for holding the shock-lifting mechanism suspended, means for automatically releasing said suspending means at a point above the tilting platform, a winding drum for said lifting mechanism, power-driven driving means for said drum, a separable driving connection between said driving means and drum, means for shifting said separable driving connection, means for holding said shifting means in driving position, and means controlled by the movement of the lifting carriage for automatically separating said driving means.

13. The combination, with a crop treating machine, of a vertically-tilting bundle-receiving platform provided at its rear with bundle-supporting means, means for tilting said platform vertically, a track-beam arranged above said platform, a carriage mounted on said track beam, means for normally holding said carriage on the track-beam in lifting position, bundle-receiving mechanism carried by said carriage, means for releasing said carriage-holding means, a winding drum for said lifting mechanism, power-driven driving means for said drum, a separable driving connection between said driving means and drum, means for shifting said separable driving connection, means for holding said shifting means in driving position, means controlled by the movement of the lifting carriage for automatically separating said driving means, and means for automatically returning the carriage to lifting position.

14. The combination, with a crop treating machine, of a vertically-tilting bundle-receiving platform provided at its rear with bundle-supporting means, means for tilting said platform vertically, a track beam arranged above said platform, a carriage mounted on said track beam, means for normally holding said carriage on the track beam in lifting position, bundle-receiving mechanism carried by said carriage, means operated by said bundle-lifting mechanism for releasing said carriage-holding means, a winding drum for said lifting mechanism, power-driven driving means for said drum, a separable driving-connection between said driving means and drum, means for shifting said separable driving connection, means for holding said shifting means in driving position, means controlled by the movement of the lifting carriage for automatically separating said driving means, and means for automatically returning the carriage to lifting position.

15. The combination, with a crop treating machine, of a vertically-tilting bundle-receiving platform provided at its rear with bundle-supporting means, means for tilting said platform vertically, a track-beam arranged above said platform, a carriage mounted on said track beam, means for normally holding said carriage on the track beam in lifting position, bundle-receiving mechanism carried by said carriage, means for releasing said carriage holding means, means carried by the carriage for holding the shock-lifting mechanism suspended, means for automatically releasing said suspending means at a point above the tilting platform, a winding drum for said lifting mechanism, power-driven driving means for said drum, a separable driving-connection between said driving means and drum, means for shifting said separable driving connection, means for holding said shifting means in driving position, means controlled by the movement of the lifting carriage for automatically separating said driving means, and means for automatically returning the carriage to lifting position.

16. The combination, with a crop treating machine, of a vertically-tilting bundle-receiving platform provided at its rear with bundle-supporting means, means for tilting said platform vertically, a track-beam arranged above said platform, a carriage mounted on said track-beam, means for normally holding said carriage on the track-beam in lifting position, bundle-receiving mechanism carried by said carriage, means operated by said bundle-lifting mechanism for releasing said carriage-holding means, means carried by the carriage for holding the shock-lifting mechanism suspended, means for automatically releasing said suspending means at a point above the tilting platform, a winding drum for said lifting mechanism, power-driven driving means for said drum, a separable driving connection between said driving means and drum, means for shifting said separable driving connection, means for holding said shifting means in driving position, means controlled by the movement of the lifting carriage for automatically separating said driving means, and means for automatically returning the carriage to lifting position.

17. The combination, with a crop-treating machine, of a bundle-receiving platform provided with shock-supporting means, of means for lifting bundles to said platform consisting in part of a longitudinal track-beam, supports for said track-beam pivoted thereto and to the machine frame, whereby the structure may be folded down upon the machine frame, lifting mechanism carried by said track-beam, and detachable means for holding said track-beam rigidly above the platform.

In witness whereof, I, have hereunto set my hand and seal at Indianapolis, Indiana, this 12th day of April, A. D. one thousand nine hundred and five.

JAMES B. SCHUMAN. [L. S.]

Witnesses:
ARTHUR M. HOOD,
JAMES A. WALSH.